United States Patent [19]

Kunkle et al.

[11] Patent Number: 4,632,687
[45] Date of Patent: Dec. 30, 1986

[54] METHOD OF MELTING RAW MATERIALS FOR GLASS OR THE LIKE USING SOLID FUELS OR FUEL-BATCH MIXTURES

[75] Inventors: Gerald E. Kunkle, New Kensington; Henry M. Demarest, Natrona Heights; Larry J. Shelestak, Bairdford, all of Pa.

[73] Assignee: PPG Industries, Inc., Pittsburgh, Pa.

[21] Appl. No.: 748,639

[22] Filed: Jun. 25, 1985

[51] Int. Cl.[4] ............................................. C03B 5/10
[52] U.S. Cl. ........................................ 65/27; 65/134; 65/135; 65/136; 65/335
[58] Field of Search ................... 65/27, 134, 135, 136, 65/335

[56] References Cited

U.S. PATENT DOCUMENTS

| 2,006,987 | 7/1935 | Ferguson | 65/134 |
| 2,337,072 | 12/1943 | Tarbox | 13/2 |
| 3,248,205 | 4/1966 | Dolf et al. | 65/134 X |
| 3,294,505 | 12/1966 | Garrison | 65/17 |
| 3,689,251 | 9/1972 | Gross | 75/40 |
| 3,969,068 | 7/1976 | Miller et al. | 423/13 |
| 4,006,003 | 2/1977 | Daiga | 65/135 |
| 4,032,121 | 6/1977 | Stift et al. | 266/163 |
| 4,381,934 | 5/1983 | Kunkle et al. | 65/135 |
| 4,496,313 | 1/1985 | Quittkat et al. | 432/14 |
| 4,551,161 | 11/1985 | Savolskis | 65/27 |

FOREIGN PATENT DOCUMENTS 658141 10/1951 United Kingdom ............... 65/134

OTHER PUBLICATIONS

Wiedmann, U., and Sieger, W., "Pulverized Coal Firing at a Cross-Fired Regenerative Tank Furnace for Green Glass," XIII International Glass Conference, Jul. 4-9, 1983, Hamburg (with translation).

Primary Examiner—Arthur Kellogg
Attorney, Agent, or Firm—Dennis G. Millman

[57] ABSTRACT

Thermally fusible material such as glass batch is liquefied using a solid carbonaceous fuel such as coal as the major energy source. In another embodiment, solid or liquid fuel is mixed with the batch material being fed to an initial liquefaction stage. Melting may be advanced further in a subsequent stage where the melt may also be re-oxidized.

40 Claims, 1 Drawing Figure

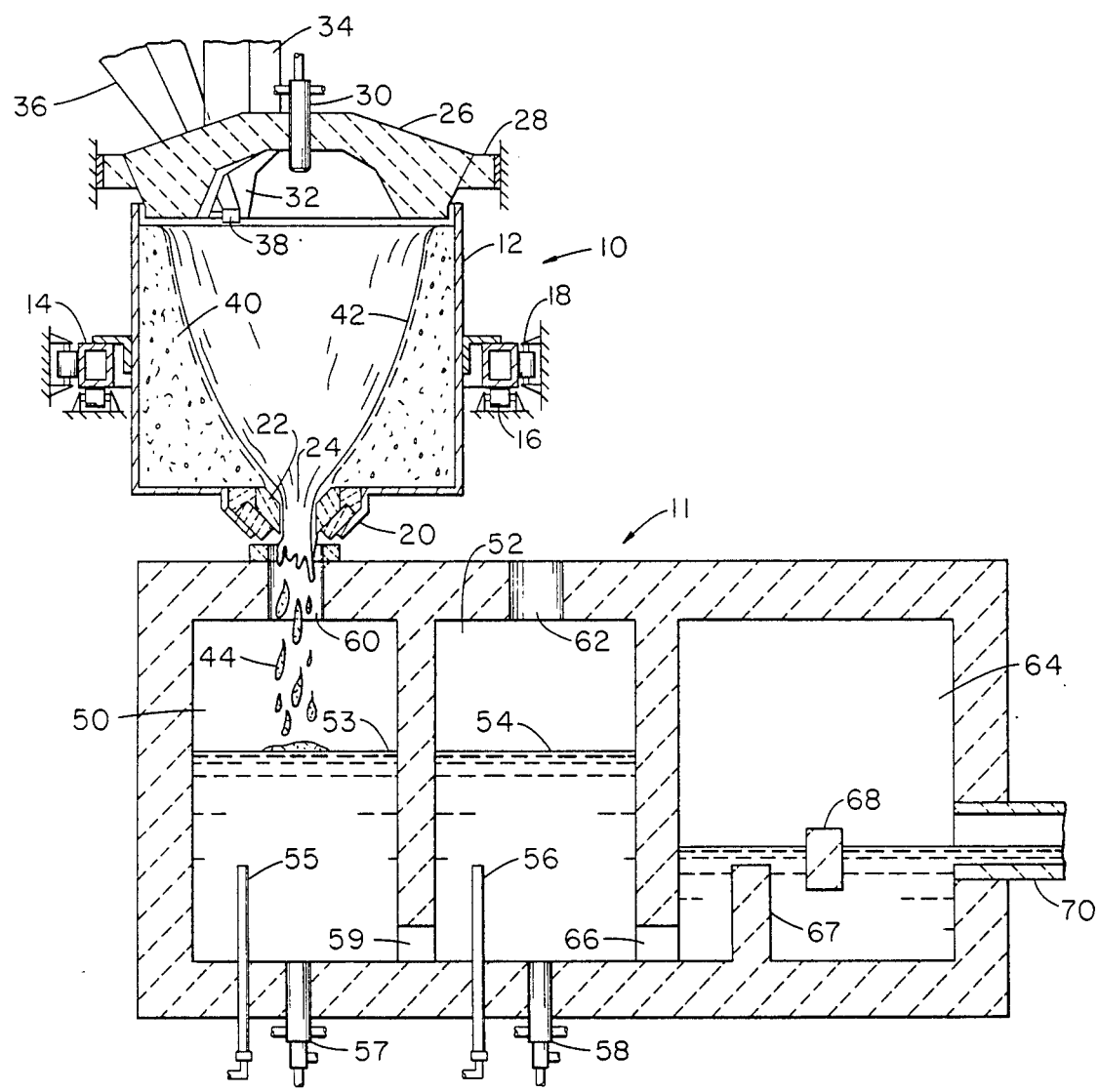

METHOD OF MELTING RAW MATERIALS FOR GLASS OR THE LIKE USING SOLID FUELS OR FUEL-BATCH MIXTURES

BACKGROUND OF THE INVENTION

This invention relates to the use of solid carbonaceous fuels such as coal as a fuel source in a process for making glass or similar fusion processes, and to the use of mixtures of solid or liquid fuels with the raw materials.

It is well known that in regions where coal is available it is usually the cheapest source of energy relative to other traditional energy sources such as natural gas, fuel oil, and electricity. Therefore, it has been suggested that coal be used as a fuel source for melting glass and the like. Examples of such proposals may be seen in U.S. Pat. Nos. 3,969,068 and 4,006,003. However, the use of coal to fuel direct fired process furnaces has been found to have certain drawbacks that have discouraged its widespread use. A major drawback is the ash content of coal. When coal is combusted with an overhead burner in an open hearth type furnace conventionally employed to melt glass, substantial amounts of ash are entrained in the exhaust gas stream which can cause the regenerators to become plugged and which necessitates removal of the ash from the exhaust gas before it can be discharged to the atmosphere. Some of the ash becomes deposited on the walls of the melting chamber where it melts to a liquid slag that runs down the walls of the vessel into the melt. The runnage of molten slag has a deleterious affect on the refractories of the furnace, and the molten slag entering the melt introduces unwanted compositional variations and inhomogeneities into the product material. The slag often has a high iron content relative to glass, and runnage of the slag into the melt can cause undesirable streaks of coloration. These problems have discouraged the use of coal as a direct fuel for melting products for which uniformity of composition is an important consideration. This is particularly the case with flat glass, where compositional variations cause optical distortion in the product glass.

A drawback to the use of coal or other carbonaceous fuel in admixture with the raw materials, particularly when melting clear glass, is that carbon in amounts sufficient to provide significant energy to the melting process also has a reducing effect on the melt, and iron and sulfur present in a reduced glass cause brown coloration. Moreover, coal itself contributes iron and sulfur to the melt. Small amounts of powdered coal (typically less than 0.1% by weight) have been included in clear glass batch to aid the melting process, but such amounts are not significant energy sources, and larger amounts were considered detrimental. Even when brown glass is being produced, the amount of carbon employed would not be considered a significant fuel contribution.

U.S. Pat. No. 3,294,505 discloses melting glass in a bed of batch briquettes and coke. The process is restricted to a relatively narrow group of low viscosity glass compositions for low quality applications. Additionally, it would be desirable to avoid the cost of agglomerating the batch.

In commonly assigned, copending U.S. application Ser. No. 624,879 filed June 27, 1984, now U.S. Pat. No. 4,551,161, there is disclosed a technique of wetting glass batch with fuel oil. Only a minor portion of the energy requirement of the melting process is supplied by the fuel oil.

SUMMARY OF THE INVENTION

In the present invention, combustion of ash-containing fuel such as coal is employed as a significant heat source in a melting process while avoiding the problems associated with the ash content. By avoiding ash entrainment in the exhaust and slag formation on the interior surfaces of the furnace, environmental problems and deterioration of the furnace are avoided, thus making the process attractive for any high-temperature melting process. But the avoidance of slag runnage into the melt makes the process particularly attractive for the melting of glass and the like where compositional homogeneity is important. It is also possible by the present invention to supply a major portion of the thermal energy for melting by mixing substantial amounts of fuel (either solid or liquid) with the batch materials while preventing permanent reduction of the molten product. Undesired coloration of clear glass by iron and sulfide ions can thus be avoided.

In the present invention, fuel that may have an ash content is combusted at a stage of the melting process devoted to initially liquefying the batch material, so that any slag that forms from the ash content of the fuel becomes integrated into the liquefying material. Since the slag is incorporated into the product stream at an early stage of the melting process it can be subjected to homogenization at that stage and in subsequent stages of the melting process.

Preferred embodiments of the liquefaction stage entail sloped melting surfaces encircling a central cavity, whereby a large portion of the vessel interior surface area constitutes melting material upon which the ash or slag may be trapped. Batch is fed onto the sloped surface as liquefied material flows down the sloped surface to a drain. In a subsequent stage the melting process may be furthered. The relatively small amount of refractory exposed to slag in the liquefaction stage reduces the potential for erosion of the vessel and concentrated runnage of slag into the melt.

The batch material and the coal or other solid or liquid fuel are preferably in contact with each other as the fuel is combusted in the liquefaction stage. The fuel and batch may be fed separately, but it is preferred to mix the fuel with the batch prior to feeding. Once the liquefaction zone is heated to the ignition point of the fuel, combustion of the fuel is sustained by supplying an oxidizing agent, preferably substantially pure oxygen, to the zone of combustion.

In an alternative embodiment, a burner of a known type for burning powdered solid fuels such as coal may be utilized in the liquefaction stage. Any gas-entrained ash is collected on the encircling melting surfaces and becomes integrated into the liquefied batch material.

The chemical constituents of coal ash are generally compatible with those for most glasses, and therefore the glasses can incorporate some of the ash with little or no detrimental affect on the glass product, provided that the ash can be thoroughly homogenized in the melt. Unlike conventional melting processes, the present invention provides homogenization of the ash by employing coal in a discrete liquefying zone, so that coal can constitute the major energy source even for clear flat glass. Other advantages are achieved by the present invention in that coal is employed as the fuel in a discrete stage of the overall melting process so that less coal is required and therefore less ash is produced. Moreover, the efficiency of the staged melting process has been found to reduce the overall energy requirements for melting glass, further reducing fuel requirements.

In the case of glass, the melting process involves not only thermal melting of some ingredients, but also chemical reactions, dissolution of residual solid material in the molten phase, and escape of gaseous products of reaction. In the preferred embodiments of the present invention the liquefaction stage involves changing the state of the feed material from a granular solid to the initial liquid. In the liquefaction stage, melting of the lower melting temperature constituents creates an initial molten phase, and much of the chemical reaction is effected, but dissolution of solids and degassing are incomplete in the liquid drained from the first stage. Thus, a second stage may be provided to aid these facets of the melting process. The second stage may also be used to adjust the oxidation state of the glass, in particular to re-oxidize glass that may have become reduced, so as to produce clear glass. When the fuel is mixed with the batch, there may be incomplete contact between the fuel and the oxidant in the liquefaction zone, and thus the liquefied material may exit the first stage in a reduced state. The second stage may include means to re-oxidize the melt, for example, by means of submerged combustion with an oxygen-rich flame and/or by bubbling an oxidizing agent (preferably oxygen) through the melt.

The novel fuel arrangements of the present invention may constitute the entire fuel source or may supplement conventional heat sources. The portion of the total thermal energy requirement of the liquefaction stage contributed by the novel arrangements is substantial; that is, greater than that provided by prior art inclusion of carbonaceous material as a melting aid, coloring agent, or binder. It is believed that contributing as much as 5 percent of the energy is uncharacteristic of these prior art uses of carbonaceous materials in a melter. For economic reasons, it is preferred that the novel fuel usage of the present invention be maximized so that it supplies a majority of the energy to the liquefying stage, and optimally all of the energy.

Other environmental advantages also result from the invention. The stagewise approach lends itself to the use of oxygen instead of air to support combustion. The elimination or reduction of the amount of nitrogen in the combustion gases reduces the amount of nitric oxides ($NO_x$) produced. Exhaust gas volumes are considerably reduced when using oxygen firing, thereby reducing gas velocity, which in turn yields less entrainment of particulate batch material. The absence of nitrogen also produces a higher flame temperature. The use of essentially pure oxygen and the exclusion of all air maximizes these advantages, but the advantages can be partially realized in accordance with the degree to which the oxygen concentration exceeds that of air.

Another environmental advantage is that some of the sulfurous emissions usually associated with the combustion of sulfur-containing fuels such as coal may be suppressed. Contact between the combustion gases and the batch material (particularly glass batch containing limestone or the like) may remove sulfur oxides from the gas stream.

It is another advantage of the present invention that it can be used in the melting of a wide variety of glass compositions or the like, including relatively viscous glasses such as soda-lime-silica glasses. It is useful in the manufacture of flat glass, container glass, fiber glass, and sodium silicate glass for example. It is also advantageous that no agglomeration of the batch is required.

The invention will be more fully understood from the drawing and the description which follows.

THE DRAWING

The drawing shows a preferred embodiment of the present invention including a rotary first stage liquefaction chamber and a second stage chamber employing submerged combustion and oxygen bubbling.

DETAILED DESCRIPTION

The detailed description of the invention is made with reference to an example of a glass melting operation for which the invention has been found to be particularly useful. However, it should be understood that the invention is applicable to the melting of other, similar materials and in particular to the conversion of mineral-type materials to a molten state. Other examples include: fusing of glassy and ceramic materials, melting of frits, and smelting of ores.

The specific preferred embodiment depicted in the figure includes a liquefaction stage 10 and a refining stage 11. The first stage liquefaction is carried out in accordance with the teachings of U.S. Pat. No. 4,381,934 of Kunkle et al. and of U.S. patent application Ser. No. 661,267, filed Oct. 16, 1984, also of Kunkle et al., the teachings of which are hereby incorporated by reference. This type of liquefaction is characterized by a sloped melting surface elevated above the resulting molten material and adapted to receive batch materials that melt as a thin layer on the sloped surface and quickly drain therefrom when liquefied. In its simplest form, such a liquefaction stage could be a ramp-like structure onto which the batch is fed. The liquefaction stage 10 shown here is a preferred embodiment of the Kunkle et al. teachings wherein the sloped surface substantially encircles a central cavity and the vessel rotates about a substantially vertical axis. The circular arrangement offers distinct advantages for the present invention and for the efficiency of the melting process in general, but it should be understood that the present invention in its broader aspects is not limited to the circular liquefaction arrangement.

By separating the liquefaction step from the remainder of the melting process, an environment is provided in which a large portion (substantially all) of the ash content of the fuel may be incorporated into the product material without detrimentally affecting the homogeneity of the product. The rapid flow of liquefied material from the liquefaction stage has a substantial mixing effect, and processing in subsequent stages preferably subjects the liquefied batch and slag to further homogenization. Furthermore, because melting takes place in a relatively thin layer, fuel mixed with the batch material has good access to oxygen so that combustion is relatively complete.

It is an advantage of the staged approach to melting of the present invention that energy is employed more efficiently in each stage of the process by optimizing the conditions in each stage to meet the particular needs of the step being performed there. Additional efficiencies are achieved by encircling the heated zone with the batch material and by employing an insulating layer of the batch material or a compatible substance to thermally insulate the liquefaction zone. Because of the overall energy efficiency of the stagewise process, and because only a portion of the overall energy requirement for melting is consumed in the liquefaction zone, it has been found that the amount of fuel consumed in the liquefaction stage is relatively low compared to the fuel consumption of a conventional melting process. Therefore, the entire fuel supply for the liquefaction stage may be provided by a relatively small amount of coal, and the amount of ash produced can be readily homogenized into the product melt without detrimental effect on the physical or chemical properties of the product.

The ability to employ coal is an advantage of the present invention because of the abundant supply and relative low cost of coal in some regions. But other solid or liquid carbonaceous fuel materials may be used to advantage in the present invention, for example, fuel oil, coke fines, petroleum coke, peat, lignite, oil shale, sawdust, bagasse, and paper waste. These fuels, like the coal, may be mixed with the batch before being fed to the liquefaction stage, thereby gaining the advantage of intimate contact between the burning fuel and the batch materials. Liquid petroleum products such as fuel oil also have the advantage of wetting the batch so as to suppress dust formation and entrainment in the exhaust gas stream. Because of the stagewise approach and the relatively low energy requirement of the liquefaction stage, substantially the entire fuel requirement for the liquefaction stage can be mixed with batch materials without having an undue reducing affect on the melt. Any undesired reduction that does occur is readily reversed in the subsequent refining stage. When using coal or other solid, ash-containing fuel, the present invention yields advantages over the prior art even when the fuel is not mixed with the batch, but rather is combusted within the liquefaction chamber by means of a pulverized fuel burner of a conventional type. In that case, firing with oxygen is desirable to provide suitably high temperatures for liquefying.

With reference to the drawing, the liquefaction stage 10 includes a generally cylindrical vessel 12 which may consist of a steel drum. The vessel 12 is supported on a circular frame 14 which is, in turn, mounted for rotation about a generally vertical axis corresponding to the centerline, or axis of symmetry, of the vessel on a plurality of support rollers 16 and aligning rollers 18. A bottom section 20 of the vessel holds an axially aligned annular bushing 22 defining a central drain opening 24. The bushing 22 may be comprised of a plurality of ceramic pieces, and the bottom section 20 may be detachably secured to the remainder of the vessel 12 so as to facilitate changing the bushing 22.

A refractory lid 26, preferably in the configuration of an upward dome, is provided with stationary support by way of a surrounding frame member 28. The lid 26 may include at least one opening through which may be extended at least one cooled gas supply conduit 30. The supply conduit 30 may constitute a burner or merely a supply conduit for oxygen or other oxidizing agent to support ignition of the fuel being supplied to the liquefaction chamber. Initially, a burner, electric arc or plasma torch is employed to elevate the temperature of the cavity within the liquefaction zone to the combustion point of the fuel being used. If fuel is being supplied with the batch, the conduit 30 may be used to supply oxygen or the like to the vessel after the ignition temperature has been achieved. Optionally, a portion of the heat for the first-stage liquefaction may be supplied by a conventional burner or other heat source in addition to the energy being provided by fuel mixed with the batch. The conduit 30 may be centrally located as shown to flood the entire cavity with oxygen, or it may be angled or located off-center to direct the oxygen and/or fuel onto the melting layer.

An opening 32 through the lid 26 and a chimney 34 may be provided for conducting exhaust gases out of the vessel 12. The exhaust gas may be passed to means for removing particulates from the exhaust or to waste heat recovery means. Preferably, particulates may be removed and waste heat recovered by passing the exhaust into contact with incoming batch materials. A batch mixture including carbonates is also useful in stripping sulfur oxides from the exhaust. An example of such an arrangement includes a rotary kiln for batch preheating as shown in U.S. patent application Ser. No. 516,817 filed July 25, 1983, now U.S. Pat. No. 4,519,814, by Henry M. Demarest, Jr., the disclosure of which is hereby incorporated by reference. The opening 32 may also be used for feeding the batch to the liquefaction stage, and as shown in the drawing, a feed chute 36 may be provided for this purpose. An adjustable baffle 38 may be provided at the end of the chute 36 to direct the flow of batch onto the sidewalls of the vessel 12.

Preferably, a stable layer of pulverulent material 40 lines the interior of the vessel 12. This layer acts as the insulating lining to protect the vessel 12 from the heat within the vessel. In those applications where it is desired to avoid contamination of the product material, the layer 40 is preferably of substantially the same composition as the batch material. Before the melting process is started, the stable lining 40 is provided in the melter by feeding loose pulverulent material such as the batch material through the feed chute 36 while the vessel 12 is rotating. The loose material assumes a generally parabolic contour as shown in the drawing. The pulverulent material may be wetted, for example, with water during the initial stage of forming the stable lining to facilitate cohesion of the layer along the sidewalls. When the lining 40 is comprised of batch material, it need not include the fuel component that may be mixed with the batch during operation. Other minor differences between the lining material and the throughput material may be acceptable, depending upon the requirements of the particular process.

During the melting process, continuous feeding of batch to the liquefaction stage 10 results in a falling stream of batch that becomes distributed over the face of the stable lining 40, and by the action of the heat from combustion within the vessel 12 becomes liquefied in a transient layer 42 that runs to the bottom of the vessel and passes through the open center 24 in the bushing 22. The liquefied material 44 falls from the first stage 10 into the second stage 11 for further processing. In this manner, the initial step of liquefying the batch can be efficiently carried out because the material, once it has become liquefied, is immediately removed from the vicinity of the heat source and is continuously replenished with fresh batch material, thereby maintaining a large temperature difference and therefore a high rate of heat transfer in the liquefaction vessel. The constant replenishment with relatively cool, fresh batch in cooperation with the insulating lining serves to preserve the structural integrity of the liquefaction vessel without the use of forced cooling of the vessel.

The material for the lining 40 provides thermal insulation and preferably also serves as a non-contaminating contact surface for the transient melting layer 42 and, most preferably, the stable lining includes one or more constituents of the batch material. It is desirable for the thermal conductivity of the material employed as the lining to be relatively low so that practical thicknesses of the layer may be employed while avoiding the need for wasteful forced cooling of the vessel exterior. In general, granular or pulverulent mineral source raw materials provide good thermal insulation, but in some cases it may be possible to use an intermediate or product of the melting process as a non-contaminating, stable layer. For example, in a glassmaking process pulverized cullet (scrap glass) could constitute the stable layer, although a thicker layer may be required due to the higher thermal conductivity of glass as compared to glass batch. In metallurgical processes, on the other hand, using a metallic product as the stable layer would entail unduly large thicknesses to provide thermal protection to the vessel, but some ore materials may be satisfactory as insulating layers.

The preferred embodiment of the liquefaction stage described above entails rotating the lining about the central cavity, but it should be understood that the present invention is applicable to embodiments in which the lining encircles the heated cavity but is not rotated. Additionally, the invention is applicable to embodiments in which the lining is a sloped surface, but does not encircle the heat source (e.g., melting takes place on a ramp). Examples of such variations are described in the aforesaid Kunkle et al. patent and application.

Air could be used as the oxidant in the liquefaction stage, but it is preferred to use oxygen so as to reduce the volume of gaseous throughput. As a result, the cavity in the liquefaction stage may be made compact, and the exhaust gas stream is relatively low in volume and high in temperature, thereby facilitating heat recovery from the exhaust. The intense heat of combustion supported by oxygen is compatible with the preferred embodiments because of the thermal protection and efficient heat transfer afforded by the encircling lining.

For economic reasons, coal is the preferred fuel and, in particular, bituminous coal. The heating value of a typical Pennsylvania bituminous coal is generally in the range of 11,000 to 15,000 BTU per pound (25.5 million to 34.8 million joules per kilogram) with an ash content ranging from about 3 percent to 9 percent by weight depending upon the source. To melt glass in a conventional, efficiently operated, overhead fired, regenerative furnace burning natural gas or fuel oil is generally considered to consume at least about 6 million to 7 million BTU per ton (7 million to 8 million joules per kilogram) of glass produced. Taking a typical Pennsylvania coal as an example, with a heat value of about 13,800 BTU per pound (32 million joules per kilogram) and an ash content of about 7 percent by weight, combustion of such a coal in a conventional glass melting furnace to meet the entire energy requirements of melting would yield an unacceptably large amount of ash. The liquefaction process described above has been found to consume from about 2 million to about 3 million BTU's per ton (2.3 million to 3.5 million joules per kilogram) of throughput. At that level of energy consumption, much less coal is required to supply the energy needs, and therefore the ash introduced into the melt from the coal is at acceptable levels even for producing glass of the high quality level required for flat glass.

The amount of coal to be utilized in the liquefaction zone will, of course, depend upon the heat content of the particular coal, which in turn is a function of its fixed carbon content. With the Pennsylvania coal described above, adding coal in an amount equal to about six percent by weight of the batch should theoretically provide the total energy required for the liquefaction of flat glass batch. But because combustion is not complete due to inaccessibility of oxygen to all parts of the coal, adding slightly more coal than is theoretically required is preferred if coal is to supply the total energy requirements of the liquefaction stage. Therefore, in the previous example it is preferred to add coal in the amount of about ten percent of the batch weight. Carbonaceous fuel materials other than coal may be added in amounts determined by their respective heat contents. The invention also encompasses supplying less than the total energy requirement of the liquefaction stage by means of the batch carbon content. In such a case, part of the energy may be provided by batch carbon, and the remainder may be provided by a conventional fuel burner or other heating means in the liquefaction chamber.

The solid fuels such as coal to be mixed with the batch are preferably finely divided. The coal for example, is preferably no coarser than 60 mesh (U.S. standard sieve size) and 200 mesh coal has been found to be particularly satisfactory. The ignition point of coal varies somewhat, but it has been found that the combustion of a typical coal in a glass batch mixture is generally self-sustaining at temperatures above 1,100° F. (590° C.) when supplied with pure oxygen.

The following is a typical ash content from 25 parts by weight

| $SiO_2$ | 1.2 parts by weight |
|---|---|
| $Al_2O_3$ | 0.6 |
| $Fe_2O_3$ | 0.27 |
| CaO | 0.1 |
| Na and K | 0.5 |

It can be seen that these ash constituents are compatible with the composition of soda-lime-silica flat glass which may have the following composition:

| $SiO_2$ | 72-74 | % by weight |
|---|---|---|
| $Al_2O_3$ | 0-2 | |
| $Na_2O$ | 12-15 | |
| $K_2O$ | 0-1 | |
| MgO | 3-5 | |
| CaO | 8-10 | |
| $Fe_2O_3$ | 0-0.2 | |
| $SO_3$ | 0-0.5 | |

Soda-lime-silica glass of the above type usually has a viscosity of at least 100 poises at a temperature of 1425° C.

The temperature at which the batch liquefies will depend upon the particular batch materials, especially the amount and melting temperature of its lowest melting temperature ingredients. With glass batch, the most common low temperature melting ingredient is soda ash which melts at 1564° F. (851° C.). In practice, it has been found that commercial flat glass batch formulas liquefy at a somewhat higher temperature, about 2,000° F. (1090° C.) to about 2100° F. (1150° C.). Heat within the liquefaction stage may raise the temperature of the liquefied material slightly higher before it drains from the stage, and thus liquefied glass batch flowing from the liquefaction stage 10 may typically have a temperature on the order of about 2300° F. (1260° C.) but usually no higher than 2400° F. (1320° C.). Such a temperature and the short residence time in the liquefaction vessel are seldom adequate to fully complete the complex chemical and physical reactions involved in the melting process. Accordingly, the liquefied material is transferred to a refining stage 11 in which the melting process is furthered. For glass, treatment in the refining zone typically entails raising the temperature of the liquefied material to facilitate melting of residual sand grains and to drive gaseous inclusions from the melt. A peak temperature of about 2500° F. (1370° C.) to about 2800° F. (1510° C.) is considered desirable for refining flat glass. Another desirable operation that may be carried out in this stage is to homogenize the molten material by agitation. Also, when fuel has been incorporated into the batch, the incomplete combustion of the coal in the liquefaction stage results in the molten material entering the refining stage in a reduced condition which, for many applications, needs to be corrected. Therefore, a function of the refining stage in the present invention is to introduce an oxidizing agent into the melt. All of these objectives are achieved by the preferred embodiment shown in the drawing.

The vigorously stirred refining stage is well adapted not only for adjusting the oxidation state of the melt, but also for adding colorants, cullet, or compositional modifiers that are relatively easily melted. Great flexibility for making a wide variety of products is thus provided.

The preferred embodiment of the refining stage as shown in the drawing employs submerged combustion in two chambers. A single-chambered refining stage may suffice for some applications, but for flat glass the preferred embodiment entails two submerged combustion chambers 50 and 52, each retaining a pool 53 and 54, respectively, of the molten material. The chambers may be provided with oxygen bubbler tubes 55 and 56 and water-cooled burners 57 and 58 below the level of the molten material. A submerged throat 59 permits material to flow from chamber 50 into chamber 52. An opening 60 at the top of chamber 50 permits the molten material 44 to fall from the liquefaction stage 10 into tha chamber 50. Exhaust may pass in the opposite direction through the opening 60. Similarly, in chamber 52 an opening 62 is provided in the upper portion thereof for the escape of exhaust gases.

Fuel such as natural gas and an oxidant, preferably oxygen, are fed to the burners 57 and 58 and combustion occurs as the gas streams enter the molten pools 53 and 54. Another fuel which may be used to advantage in the submerged combustion burners is hydrogen because its product of combustion is water, which is highly soluble in molten glass. Employing oxygen as the oxidant is advantageous because it avoids introducing into the melt the major nitrogen constituent of air, which has poor solubility in molten glass. Using undiluted oxygen also improves contact between the oxygen and the reduced species in the melt. An excess of the oxidant may be provided to the burners beyond that required for combustion of the fuel so as to correct the reduced condition of the liquefied material entering the refining stage. Alternatively, if the liquefied material entering the refining stage includes a sufficient amount of uncombusted carbon, or if the temperature of the melt need not be increased, the oxidant alone may be injected into the molten pools 53 and 54 so as to provide the re-oxidizing function only. The oxidant may be introduced separately from the submerged combustion burners, such as through bubbler tubes 55 and 56. It has been found advantageous to use bubblers in combination with submerged combustion. The bubblers can be adapted to inject a stream of small bubbles of oxidant into the melt, which enhances the surface area of contact between the melt and the oxidant gas, and the submerged combustion provides vigorous agitation to mix the oxidant bubbles throughout the molten mass. The submerged combustion also provides very effective homogenization of the melt.

The amount of excess oxidant to be supplied to the refining stage will vary depending upon the particular conditions encountered and will depend upon the degree of reduction of the material entering the stage and the oxidation state desired for the final product. The degree of agitation, the vessel size and configuration, the effectiveness of the gas-liquid contact, and the residence time within the refining stage are factors in achieving re-oxidation. In order to achieve homogeneous re-oxidation to meet the standards for flat glass, it has been found preferable to carry out the re-oxidation in two sequential chambers as shown in the drawing, thereby providing greater assurance that each portion of the throughput is subject to oxidizing conditions during an adequate residence time. In glass, a reduced condition yields a brown colored glass due to the presence of sulfur in the sulfide state in conjunction with iron oxide. If clear glass is desired, re-oxidation is carried out to sufficiently raise the oxidation state of the coloring ions, typically expressed in terms of the $Fe^{+3}/Fe^{+2}$ ratio. For a standard commercial grade of clear float glass the $Fe^{+3}/Fe^{+2}$ ratio is in the range of about 1.5 to 3.0, with a transmittance of at least 70% (preferably at least 80%) to light having a wavelength of 380 nanometers at a thickness of 6 millimeters. Clear float glass may sometimes also be characterized by at least 60% transmittance at 1000 nanometers (6 millimeter thickness). $Fe^{+3}/Fe^{+2}$ ratios considerably greater than the above have been achieved by bubbling oxygen into molten glass that was initially dark brown. The change in coloration from brown to clear upon oxidation is readily observable, so that the appropriate degree of oxidation can be easily estimated by visual observation. Although coal may contribute excess iron to the melt, a clear glass can be obtained by re-oxidizing. But precise spectral matching of standard float glass transmittance may require reducing the amount of iron that is usually deliberately included in the batch (usually as rouge) for coloration.

Downstream from the re-oxidizing chambers, there may be provided a conditioning chamber 64 as shown in the drawing in which additional residence time may be provided for the escape of gaseous inclusions from the melt and for the melt to cool to a temperature suited for subsequent processing. The molten material may enter the conditioning chamber 64 through a submerged throat 66. In the arrangement shown, residence time within the chamber 64 is extended by means of a submerged dam 67 and a skim barrier 68 which establish a tortuous path for the melt stream. The processed molten material may be drawn from the refining stage 11 through a canal 70 which may lead to a forming process or the like, which, in the case of glass, may form the glass into a sheet, fibers, bottles or the like by known means.

In a specific example, using the arrangement shown in the drawing, a standard commercial float glass batch (but omitting sulfur containing melting aids such as salt cake or gypsum) was mixed with 5% to 6% by weight of coal and melted at a rate of about 15 pounds (6.8 kg)

per hour. The coal was the sole fuel source in the liquefaction stage, and the liquefied batch was brown and foamy as it entered the refining stage. Each of the two re-oxidizing chambers was provided with a single submerged combustion burner and a single bubbler tube. Each of the submerged combustion burners was supplied with 250 standard cubic feet per hour (7 standard cubic meters per hour) of hydrogen and 130 standard cubic feet per hour (3.6 standard cubic meters per hour) of oxygen. Each of the bubblers was fed 20 standard cubic feet per hour (0.56 standard cubic meters per hour) of oxygen. The volume of molten material in each chamber was between one and two cubic feet (0.28 to 0.56 cubic meters), and the average residence time for an increment of the melt to pass through both chambers was estimated to be about 30 minutes. The temperature in the first chamber was about 2350° F. (1290° C.), and the temperature in the second chamber was about 2500° F. (1370° C.). An auxiliary burner (not shown) was provided in the head space of chamber 64 to help collapse foam. The glass draining from the refining stage was clear, nearly bubble-free, and was more oxidized than commercial float glass. The batch mixture used would conventionally yield a glass having an iron content (expressed as $Fe_2O_3$) of about 0.11% by weight. Due to iron contributed by the coal, the glass in the example was found to have 0.16 percent by weight iron. Sulfur from the coal was found to produce glass having 0.063 weight percent $SO_3$ without re-oxidizing, and less than 0.01 $SO_3$ with re-oxidizing.

The detailed description of this invention has been set forth in connection with a best mode, but it should be understood that other variations and modifications that would be evident to those of skill in the art may be employed within the spirit and scope of the invention as defined by the claims which follow.

We claim:

1. A method of liquefying glass batch or the like comprising: contacting pulverulent glass batch material with a solid or liquid fuel having an ash content, the fuel being provided in an amount sufficient to supply a major portion of the energy required to liquefy the batch material, combusting the fuel so as to liquefy the batch material, and mixing the ash from the combusted fuel into the liquefying batch at the region of combustion sufficiently rapidly that substantially all of the ash is incorporated into the liquefying batch and flows from the combustion zone entrained therein, whereby buildup of ash deposits in the combustion zone is substantially avoided.

2. The method of claim 1 wherein the batch is a soda-lime-silica glass batch.

3. The method of claim 2 wherein the batch is formulated to produce a glass having a viscosity of at least 100 poises at 1425° C.

4. The method of claim 1 wherein the fuel is mixed with the batch prior to being fed to a vessel in which the combustion takes place.

5. A method of liquefying glass batch or the like comprising: contacting pulverulent glass batch material with a solid or a liquid fuel having an ash content, the fuel being provided in an amount sufficient to supply a major portion of the energy required to liquefy the batch material, combusting the fuel so as to liquefy the batch material on a sloped surface encircling a central cavity, and incorporating substantially all of the ash into the liquefied product.

6. The method of claim 5 wherein the liquefied material is drained from the sloped surface in a reduced condition, and is passed to a downstream zone where it is subjected to re-oxidizing conditions.

7. The method of claim 1 wherein the fuel in contact with the batch material constitutes substantially the entire energy source for liquefying the batch.

8. The method of claim 1 wherein the fuel is coal

9. The method of claim 1 wherein the fuel is a liquid petroleum product.

10. The method of claim 1 wherein the combustion of the fuel is supported by feeding essentially pure oxygen to the region of combustion.

11. The method of claim 1 wherein the batch material and the fuel are fed separately to the combustion zone.

12. The method of claim 1 wherein the batch material is liquefied on a sloped surface encircling a central cavity.

13. The method of claim 12 wherein the sloped surface is rotated about the central cavity.

14. The method of claim 13 wherein the rotation is about a vertical axis.

15. The method of claim 1 wherein the combustion of the ash-containing fuel and liquefaction of the batch material takes place in a first vessel from which the material flows in an incompletely melted state, and melting of the liquefied material is furthered in a separate vessel.

16. A method of melting glass comprising: heating glass batch material on a sloped surface in a first zone by combusting solid or liquid fuel in contact with the glass batch, whereby reducing conditions exist as the batch becomes liquefied, draining the liquefied glass batch to a second zone and subjecting the reduced liquefied batch material to oxidizing conditions so as to restore the oxidation state of the product to a desired level.

17. The method of claim 16 wherein the fuel contacting the batch material provides the majority of the energy for liquefying the batch material.

18. The method of claim 17 wherein the fuel is coal.

19. The method of claim 16 wherein the fuel is mixed with the batch material before being fed to a combustion zone.

20. The method of claim 16 wherein liquefied batch material in the second zone is gathered into a pool into which oxygen is injected.

21. The method of claim 20 wherein the pool in the second zone is heated by submerged combustion.

22. The method of claim 21 wherein agitation of the material in the second zone is provided by injection of combusting gases into the body of liquefied material.

23. The method of claim 22 wherein coloring material is added to the material in the second zone.

24. The method of claim 16 wherein the fuel has an ash content and the ash is substantially incorporated into the liquefied batch material.

25. The method of claim 16 wherein oxidation in the second zone is sufficient to raise the $Fe^{+3}/Fe^{+2}$ ratio of an iron-containing clear glass to at least 1.5.

26. A method of melting a thermally fusible material comprising feeding batch material and solid or liquid carbonaceous fuel onto a sloped melting surface, the fuel being provided in sufficient quantity to yield upon combustion a substantial portion of the heat required to liquefy the batch material, providing an oxidant at the sloped surface in sufficient quantity to support said combustion, draining batch liquefied by the heat from the sloped surface, gathering a pool of the liquefied batch, and providing an oxidizing agent to the pool to raise the oxidation state of the liquefied material.

27. The method of claim 26, wherein thermal energy is provided to the pool of liquefied batch so as to further the melting thereof.

28. The method of claim 27, wherein the heat is provided to the pool by means of submerged combustion.

29. The method of claim 28 wherein the pool is divided into two chambers and the liquefied material passes from one chamber to the other with submerged combustion being provided in each chamber.

30. The method of claim 29, wherein the material is glass.

31. The method of claim 26, wherein the carbonaceous fuel is coal.

32. The method of claim 31, wherein the material being melted is glass.

33. The method of claim 32, wherein coal is provided in sufficient amount at the sloped melting surface to provide substantially the entire heat required to liquefy the batch material.

34. The method of claim 26, wherein the fuel is mixed with the batch materials prior to being deposited onto the sloped melting surface.

35. The method of claim 34, wherein the fuel is a liquid petroleum product.

36. The method of claim 34, wherein the fuel is coal.

37. The method of claim 26, wherein the batch is fed onto a sloped surface that encircles a central cavity.

38. The method of claim 37, wherein the sloped melting surface is rotated around the central cavity.

39. The method of claim 38, wherein the rotation is about a substantially vertical axis.

40. The method of claim 37, wherein the rate of feeding batch is controlled relative to the rate of liquefying the batch so as to maintain a substantially stable layer of the batch material as the sloped melting surface.

* * * * *